United States Patent [19]

Matsui et al.

[11] Patent Number: 5,585,987
[45] Date of Patent: Dec. 17, 1996

[54] CAMERA SYSTEM INCLUDING ELECTRONIC FLASH DEVICE WITH SLAVE EMISSION FUNCTION

[75] Inventors: Hideki Matsui, Fujisawa; Hiroshi Sakamoto, Kawasaki; Nobuyoshi Hagiuda, Yokohama, all of Japan

[73] Assignee: Nikon Corporation, Tokyo, Japan

[21] Appl. No.: 503,493

[22] Filed: Jul. 18, 1995

[30] Foreign Application Priority Data

Aug. 25, 1994 [JP] Japan .................................. 6-200490
Aug. 25, 1994 [JP] Japan .................................. 6-200492

[51] Int. Cl.$^6$ ............................ G03B 15/03; H05B 41/34
[52] U.S. Cl. .................................. 396/171; 250/214 SF; 396/180
[58] Field of Search ................................ 354/132, 131; 315/241 P; 250/214 SF

[56] References Cited

U.S. PATENT DOCUMENTS 4,287,453  9/1981  Orban ................................ 250/214 SF
4,368,966  1/1983  Hagyuda ............................ 354/131 X

*Primary Examiner*—W. B. Perkey

[57] ABSTRACT

A camera system including an electronic flash device with a slave emission function, includes an electronic flash device including: a light-receiving unit for receiving a steep optical signal; a light-emitting unit for slave-emitting illumination light toward an object in response to the optical signal received by the light-receiving unit; a timer for starting a time measurement operation in response to the optical signal input to the light-receiving unit, and permitting an operation of the light-emitting unit after an elapse of a predetermined period of time; an attachment member used for attaching/detaching the device to/from a camera body; and a data communication function unit for exchanging various data including photographing information with the camera body via the attachment member; and a camera body electrically connected to the electronic flash device. In the camera system, the data communication function unit delays a synchronous time set by the camera body side in correspondence with the measurement time of the timer.

16 Claims, 6 Drawing Sheets

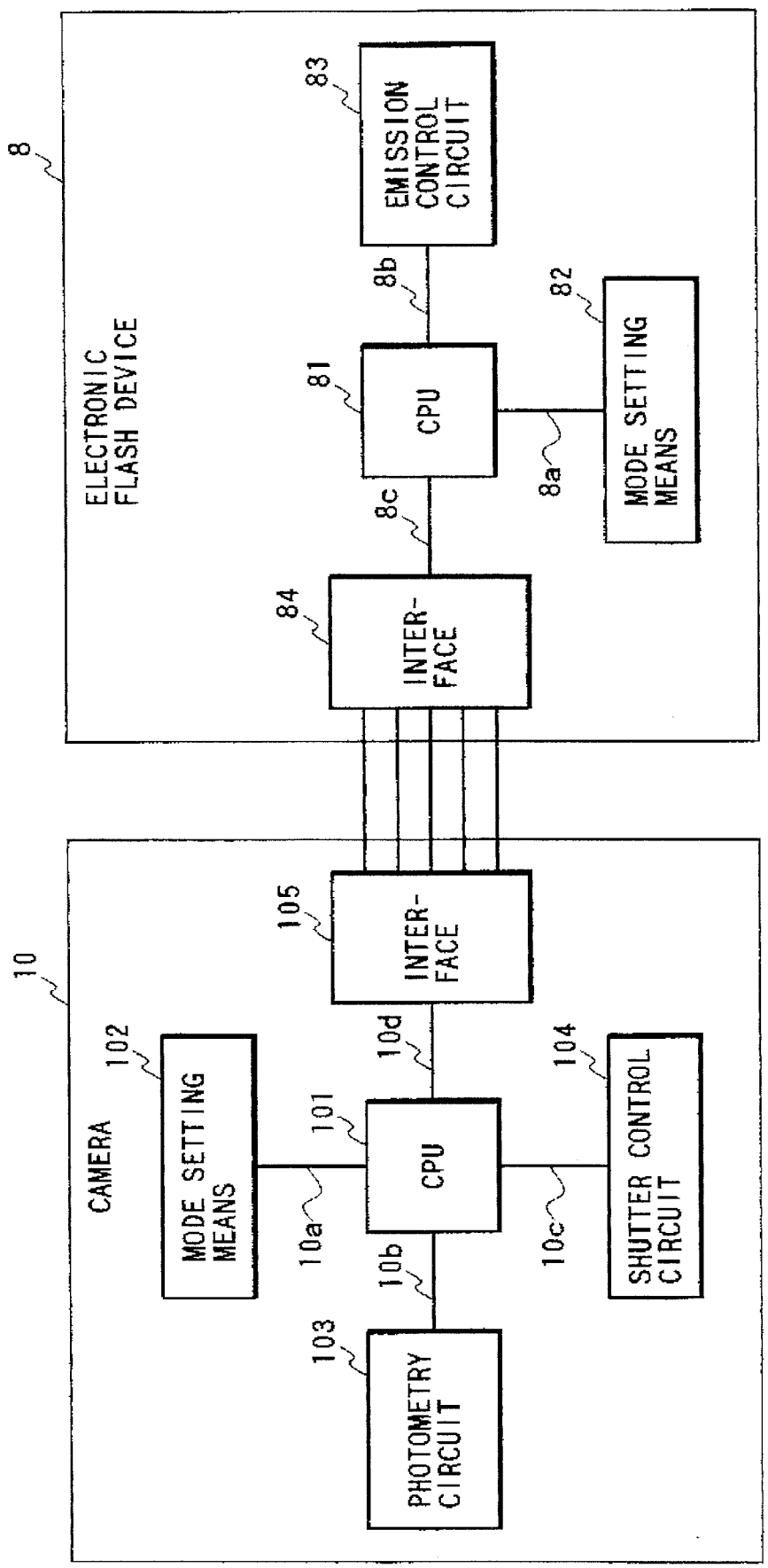

CAMERA SYSTEM INCLUDING ELECTRONIC FLASH DEVICE WITH SLAVE EMISSION FUNCTION

BACKGROUND OF THE INVENTION

1. Field of the Invention

The present invention relates to a camera system including an electronic flash device with a slave emission function.

2. Related Background Art

Conventionally, an adapter, called a wireless multiple-flash adapter or a slave unit, for wireless-controlling an electronic flash device to emit light is available. In this adapter, upon reception of a steep change in light by a light-receiving element, a switching element is turned on in response to this light, and a synchronous signal is output to control an electronic flash device connected to the adapter to emit light. Therefore, in a multiple-flash photographing operation using a plurality of electronic flash devices for illumination, the adapter and the electronic flash devices can be conveniently disposed at arbitrary positions. As the adapter, a stand-alone adapter and an adapter built in an electronic flash device are available. As an example of an adapter built in an electronic flash device, in Japanese Laid-Open Utility Model Application No. 56-3527, a light-receiving element for slave emission is disposed in the same direction as the optical axis of a light-emitting portion. On the other hand, as described in Japanese Laid-Open Patent Application No. 55-153927, a device which has a delay circuit inserted between a photosensitive element and a switching element is also proposed.

However, in the above-mentioned prior art, the slave unit operates as an independent unit. For this reason, when various TTL light control modes are executed via various data communications with a camera as with the recent trend, many problems are posed. In a so-called delayed emission mode for performing slave emission after an elapse of a delay time from master emission, the synchronous time must be delayed in advance. In such a situation, a photographer must perform a manual operation (e.g., must delay the shutter speed), and a photographing failure often occurs due to, e.g., a setting error. Furthermore, in a rear synchronous photographing operation, since a master unit starts light emission immediately before the rear curtain of the shutter begins to travel, the delayed emission by a slave unit inevitably causes a synchronization error. In this situation, selection can only be made between two alternatives, i.e., inhibition of the rear synchronous photographing operation or inhibition of the delayed slave emission operation.

SUMMARY OF THE INVENTION

It is an object of the present invention to provide a camera system which can prevent a synchronization error even in a delayed slave emission mode.

In order to achieve the above object, according to the first aspect of the present invention, there is provided a camera system including an electronic flash device with a slave emission function, which comprises: an electronic flash device including: a light-receiving unit for receiving a steep optical signal; a light-emitting unit for slave-emitting illumination light toward an object in response to the optical signal received by the light-receiving unit; a timer for starting a time measurement operation in response to the optical signal input to the light-receiving unit, and permitting an operation of the light-emitting unit after an elapse of a predetermined period of time; an attachment member used for attaching/detaching the device to/from a camera body; and a data communication function unit for exchanging various data including photographing information with the camera body via the attachment member; and a camera body electrically connected to the electronic flash device, and the camera system is characterized in that the data communication function unit delays a synchronous time set by the camera body side in correspondence with the measurement time of the timer.

The measurement time of the timer is preferably 4 ms or less. Also, preferably, the timer comprises a software circuit realized by a microcomputer, and the data communication function unit comprises a microcomputer.

According to the second aspect of the present invention, there is provided a camera body on which an electronic flash device can be mounted, the electronic flash device including: a light-receiving unit for receiving a steep optical signal; a light-emitting unit for slave-emitting illumination light toward an object in response to the optical signal received by the light-receiving unit; a timer for starting a time measurement operation in response to the optical signal input to the light-receiving unit, and permitting an operation of the light-emitting unit after an elapse of a predetermined period of time; an attachment member used for attaching/detaching the device to/from the camera body; and a data communication function unit for exchanging various data including photographing information with the camera body via the attachment member, and the camera body is characterized in that the data communication function unit delays a synchronous time set by the camera body side in correspondence with the measurement time of the timer.

Preferably, the timer comprises a software circuit realized by a microcomputer, and the data communication function unit comprises a microcomputer.

According to the third aspect of the present invention, there is provided a camera system including an electronic flash device with a slave emission function, which comprises: an electronic flash device including: a light-receiving unit for receiving a steep optical signal; a light-emitting unit for slave-emitting illumination light toward an object in response to the optical signal received by the light-receiving unit; a timer for starting a time measurement operation in response to the optical signal input to the light-receiving unit, and permitting an operation of the light-emitting unit after an elapse of a predetermined period of time; an attachment member used for attaching/detaching the device to/from a camera body; and a data communication function unit for exchanging various data including photographing information with the camera body via the attachment member; and a camera body electrically connected to the electronic flash device, and the system is characterized by further comprising: a time measurement operation inhibition unit for inhibiting the time measurement operation by the timer when one of the electronic flash device and the camera body requests a rear synchronous photographing mode to the other.

Preferably, the timer comprises a software circuit realized by a microcomputer, and the data communication function unit and the time measurement operation inhibition unit comprise a microcomputer.

According to the fourth aspect of the present invention, there is provided a camera system including an electronic flash device with a slave emission function, which comprises: an electronic flash device including: a light-receiving unit for receiving a steep optical signal; a light-emitting unit for slave-emitting illumination light toward an object in response to the optical signal received by the light-receiving unit; a timer for starting a time measurement operation in response to the optical signal input to the light-receiving unit, and permitting an operation of the light-emitting unit after an elapse of a predetermined period of time; an attachment member used for attaching/detaching the device to/from a camera body; and a data communication function unit for exchanging various data including photographing information with the camera body via the attachment member; and a camera body electrically connected to the electronic flash device, and the system is characterized by further comprising: a rear synchronous emission inhibition unit for, when the measurement time by the timer is set, inhibiting rear synchronous emission for performing light emission immediately before a shutter rear curtain begins to travel.

Preferably, the timer comprises a software circuit realized by a microcomputer, and the data communication function unit and the rear synchronous emission inhibition unit comprise a microcomputer.

According to the fifth aspect of the present invention, there is provided a camera system including an electronic flash device with a slave emission function, which comprises: an electronic flash device including: a light-receiving unit for receiving a steep optical signal; a light-emitting unit for slave-emitting illumination light toward an object in response to the optical signal received by the light-receiving unit; a timer for starting a time measurement operation in response to the optical signal input to the light-receiving unit, and permitting an operation of the light-emitting unit after an elapse of a predetermined period of time; an attachment member used for attaching/detaching the device to/from a camera body; and a data communication function unit for exchanging various data including photographing information with the camera body via the attachment member; and a camera body electrically connected to the electronic flash device, and the system is characterized by further comprising: a rear synchronous emission inhibition unit for inhibiting a rear synchronous emission mode for performing light emission immediately before a shutter rear curtain begins to travel if the measurement time by the timer is set even when the rear synchronous emission mode is requested from the camera body side to the electronic flash device.

Preferably, the timer comprises a software circuit realized by a microcomputer, and the data communication function unit and the rear synchronous emission inhibition unit comprise a microcomputer.

According to the present invention, the synchronous time is delayed or the rear synchronous photographing mode is invalidated in a delayed slave emission mode, or the delayed slave emission mode is invalidated in the rear synchronous photographing mode, automatically via data communications with the camera. As a result, a synchronization error can be prevented.

The above and other objects, features and advantages of the present invention are explained hereinafter and may be better understood by reference to the drawings and the descriptive matter which follows.

BRIEF DESCRIPTION OF THE DRAWINGS

FIG. 10 is a block diagram showing an electronic flash device according to the present invention, and a camera to which the device is connected.

DETAILED DESCRIPTION OF THE PREFERRED EMBODIMENTS

Figure 1A:
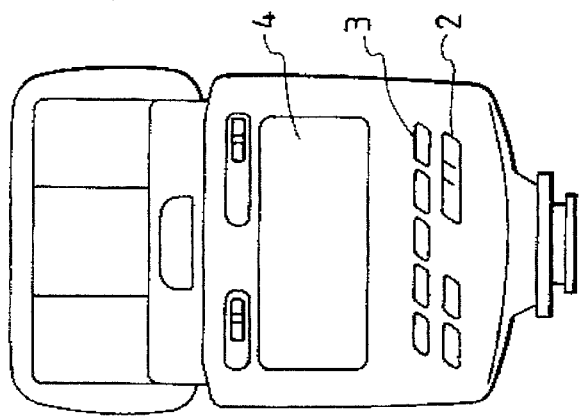
FIG. 1A is a front view of an electronic flash device according to an embodiment of the present invention.
Figure 1B:
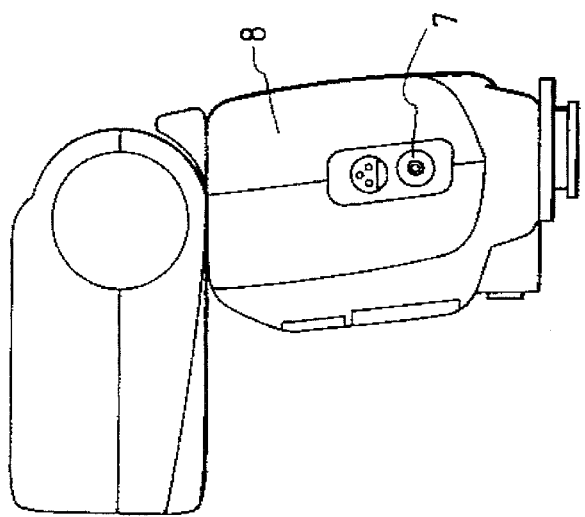
FIG. 1B is a side view of the electronic flash device according to the embodiment of the present invention.
Figure 1C:
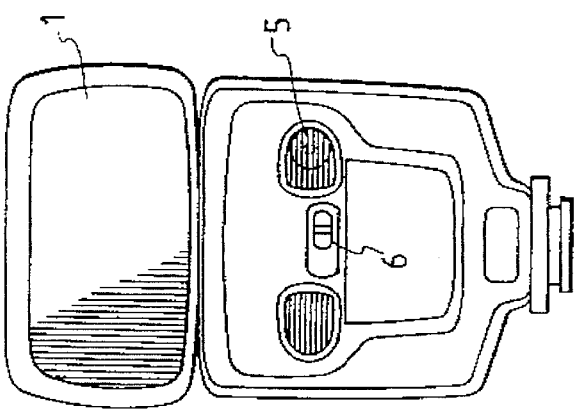
FIG. 1C is a rear view of the electronic flash device according to the embodiment of the present invention.
Figure 2:
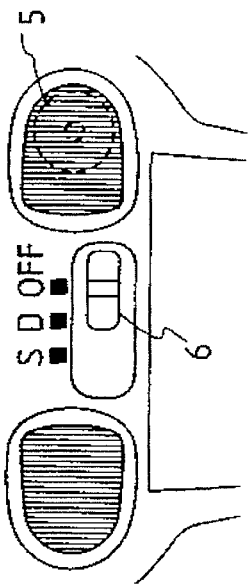
FIG. 2 is a view showing the outer appearance of a slave function setting switch of the electronic flash device according to the embodiment of the present invention.

Referring to FIGS. 1A to 1C, a light-emitting portion 1 is vertically and horizontally rotatable with respect to a main body 8, and can attain a photographing operation using bounced light. Light-receiving portions 5 for a slave function (to be described later), and a slave function setting switch 6 are disposed adjacent to each other on the front surface of the main body 8. The slave function setting switch 6 has three positions "S", "D", and "OFF", as shown in FIG. 2. A synchronous terminal 7 for a slave unit is arranged on the side surface of the main body 8. A power switch 2, various setting switches 3, and an LCD display unit 4 are disposed on the rear surface of the main body 8.

The electronic flash device has the following slave functions.

(1) Slave S Mode

When the S mode is set, the device emits light with a minimum delay in response to the steep leading edge of an optical signal from another speed light (electronic flash device), which signal is received by the light-receiving portions 5. This mode is a slave emission mode which is known to those who are skilled in the art.

(2) Slave D Mode

When the D mode is set, the device emits light after a predetermined delay time from the steep leading edge of an optical signal from another speed light, which signal is received by the light-receiving portions 5.

The setting operation of the above-mentioned slave modes and the actual operations will be described in turn below. FIG. 2 is an enlarged view of the slave function setting switch 6. The slave function setting switch 6 is a slide switch, and has three positions, i.e., the above-mentioned positions "S" and "D", and a position "OFF" at which the slave function is not selected. In FIG. 2, the position "OFF" is selected.

Figure 3:
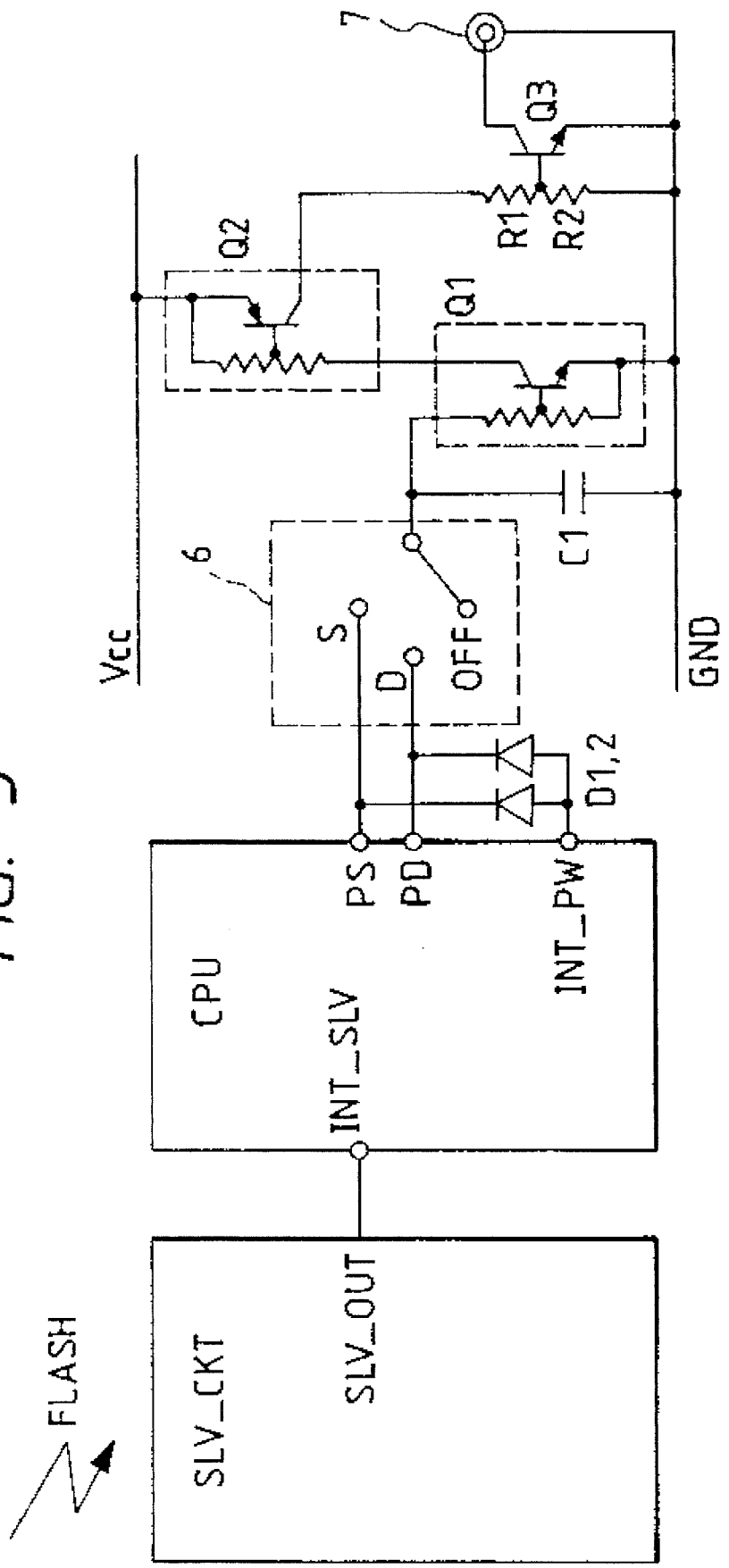
FIG. 3 is a circuit diagram showing the electrical circuit arrangement of the electronic flash device according to the embodiment of the present invention.

The slave function setting switch 6 is connected to the circuit shown in FIG. 3. A microcomputer (to be referred to as a CPU hereinafter) which controls the electronic flash device has four ports associated with the slave function. A light-receiving circuit SLV_CKT converts the steep leading edge of an optical signal received by the light-receiving portions 5 into a pulse signal, and the CPU receives the output from the circuit SLV_CKT at an interrupt input terminal INT_SLV. Terminals S and D of the slave function setting switch 6 are connected to I/O ports PS and PD of the CPU, and an OR of the ports PS and PD is connected to an interrupt input terminal INT_PW via diodes D1 and D2.

The slave function setting switch 6 is a non-shorting type switch. Therefore, one of the ports PS and PD of the CPU is connected to the base of a resistor built-in transistor Q1, or the base of the resistor built-in transistor Q1 is opened at the position "OFF". A capacitor C1 serves to absorb noise, and may be omitted. As the capacitance of the capacitor C1, a relatively small capacitance is selected not to cause a signal delay.

The collector output of the resistor built-in transistor Q1 is connected to the base of a resistor built-in transistor Q2, and the collector output of the resistor built-in transistor Q2 can supply a current high enough to drive a transistor Q3. Since the transistor Q3 directly drives a synchronous signal, a small-to-medium power transistor having a high withstand voltage is selected with a margin so as to match with electronic flash devices having various terminal voltages. Therefore, a resistor built-in transistor is not used, but resistors R1 and R2 are externally connected to the transistor Q3. As shown in FIG. 1B, the synchronous terminal 7 serves as an output terminal for a slave unit of the electronic flash device, and is also connected to a synchronous signal input terminal (not shown) of the electronic flash device. Therefore, the CPU outputs signals from the ports PS and PD to activate light emission by itself via the slave function setting switch 6 and the transistors Q1 to Q3. More specifically, the electronic flash device can perform normal light emission in response to a synchronous signal from a camera, and light emission by the above-mentioned slave function.

Figure 4:
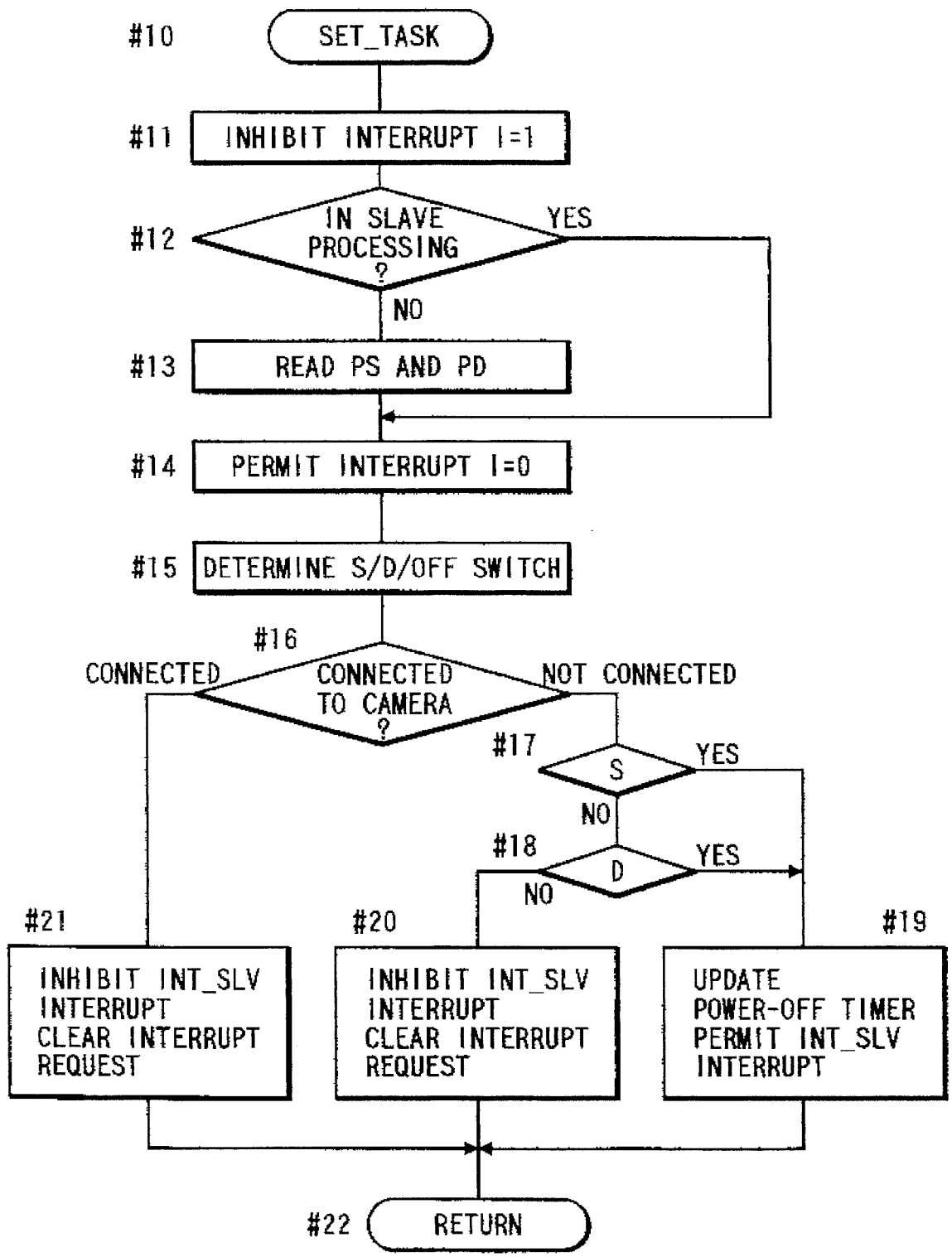
FIG. 4 is a flow chart of software of a microcomputer of the electronic flash device according to the embodiment of the present invention, i.e., showing slave function setting processing.

The operation of the slave function will be explained below as well as the software of the CPU. Note that symbol # in the following description means a step. FIG. 4 shows the flow of the processing associated with the slave function setting operation. This task is executed at predetermined time intervals, and is started when a label in #10 is called. In #11, all interrupts are inhibited. The reason for this inhibition will be explained later. In #12, it is checked if another slave processing is being executed. As the discrimination method for this purpose, a flag (not shown) is used, and is activated only during execution of slave processing. If NO in #12, since the ports PS and PD as the slave function setting switch 6 are not being accessed by the task of another slave processing, port status data can be read in #13. Even if the light-receiving circuit SLV_CKT receives effective light at this instance and triggers the interrupt input terminal, since the interrupts have been inhibited in #11 in this state, the read operation of port data is not disturbed by the task of another slave processing.

In the read operation of port data, the I/O direction registers of the ports are set in the input mode. At this time, the ports are pulled up and port data are fetched and stored. After the data registers of the ports are set at L, the direction registers are set in the output mode. In this manner, the port data can be read without supplying any output to the transistor Q1. Therefore, the ports PS and PD are set in an input state during only a given period in #13, and are set to generate outputs L in other ordinary states. In FIG. 3, these ports are active L, since the selected port is grounded via the base terminal of the resistor built-in transistor Q1. In order to allow to read L level in the input mode and to prevent the transistor Q1 from being turned on by a current flowing out from the pull-up element (not shown) for each port, the base-emitter resistance or the like of the transistor Q1 has a sufficiently small value. When these ports are not selected by the slave function setting switch 6, they are open, and change to H level by the above-mentioned pull-up. As a result, outputs H from these ports can be reliably read. In this manner, these ports can serve as both input and output ports.

On the other hand, if it is determined #12 that slave processing is being executed, since the ports PS and PD may be being accessed by the task of another slave processing, the flow skips #13, i.e., port data are not read.

In #14, the interrupt inhibition state is canceled. Therefore, since interrupts are inhibited from #11 to #14, the device cannot immediately respond to light received during this interval. However, since the light-emitting timing rarely overlaps this interval, no practical problem is posed.

In #15, the state of the slave function setting switch 6 is determined on the basis of the latest read data. As described above, the port selected by the slave function setting switch 6 is at L level. When the position "OFF" is selected, since both the ports are open, the mode is determined based on (PS, PD)=(H, H), as shown in Table 1 below. Note that (L, L) is an impossible combination. However, if this state is set, the determined value of the mode is left unchanged, and the immediately preceding discrimination result is used.

TABLE 1

| PS | PD | Determined Mode |
|---|---|---|
| H | H | OFF |
| H | L | D Mode |
| L | H | S Mode |
| L | L | Determination Left Unchanged |

Figure 1D:
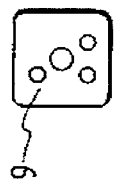
FIG. 1D is a view showing the outer appearance of an attachment member of the electronic flash device according to the embodiment of the present invention.

In #16, the flow branches depending on whether or not the electronic flash device is connected to the camera. This branching step is important, and the electronic flash device connected to the camera must not perform light emission in response to light emission of another electronic flash device since it is the master flash device. On the contrary, any electronic flash device which is not connected to the camera must perform slave emission since it is a slave unit. In #16, it is checked based on the state of electrical contacts 9 provided to an attachment member shown in FIG. 1D if the device is connected to the camera.

Figure 9:
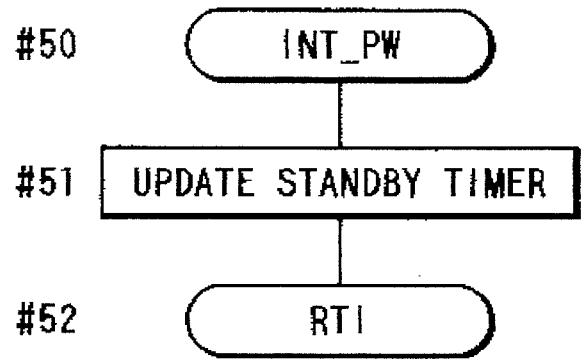
FIG. 9 is a flow chart of software of the microcomputer of the electronic flash device according to the embodiment of the present invention, i.e., showing INT_PW terminal interrupt processing.
Figure 7:
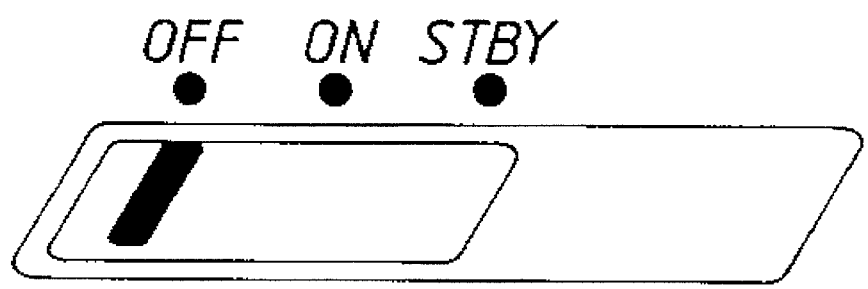
FIG. 7 is an enlarged view showing the outer appearance of a power switch of the electronic flash device according to the embodiment of the present invention.

Processing in #17 and subsequent steps in a case wherein the device is not connected to the camera will be explained below. In this case, slave emission must be performed depending on the selected mode, as described above. If it is determined in #17 or #18 that the S or D slave emission mode is selected, the flow advances to #19 to execute the two processing operations. First, a power-OFF timer of the electronic flash device is updated to prevent the timer from automatically turning off the power supply in a non-operation state. FIG. 7 is an enlarged view of the power switch 2 shown in FIG. 1C. When a non-operation state continues for 80 seconds while the power switch 2 is set at a position "STBY", the power supply of the electronic flash device is turned off to cut the consumption power current. If the electronic flash device is connected to the camera, the power supply of the electronic flash device is resumed by, e.g., the electrical contacts 9 shown in FIG. 1D in cooperation with the start of the power supply of the camera. However, since the electronic flash device as a slave unit is an independent unit, it cannot be activated by the camera. Therefore, in order to inhibit the device from being turned off even when the power switch 2 is set at the position "STBY", the power-OFF timer for counting up to 80 seconds is always updated and kept to be 0. On the contrary, when the slave function setting switch 6 is switched from the position "OFF" to the position "S" or "D" while the power switch 2 is set at the position "STBY" and the electronic flash device is OFF, the power supply of the electronic flash device must be restored to an ON state. In the circuit diagram shown in FIG. 3, since the terminal INT_PW of the CPU is connected to the port PS or PD via the diodes D1 and D2, if a trailing edge interrupt of the terminal INT_PW is enabled before a restartable power-OFF state, the CPU can be enabled upon operation of the slave function setting switch 6, and the electronic flash device can be restored to the ON state. When the power supply is turned off by manually operating the power switch 2 to a position "OFF", since it is a forced power-OFF operation, the above-mentioned trailing edge interrupt of the terminal INT_PW is not enabled. Note that the interrupt processing of the terminal INT_PW is started by jumping to an interrupt vector in #50, as shown in FIG. 9. A standby timer is updated in #51, and the flow returns from the interrupt in #52. Since the timer is updated in #51, the power supply is not immediately turned off immediately after activation. Thereafter, since the standby timer is kept updated by the processing shown in FIG. 4, the power supply is not turned off even when the electronic flash device is set in the standby mode.

The other processing in #19 is to enable an interrupt of the terminal INT_SLV. If the light-receiving circuit SLV_CKT shown in FIG. 3 outputs an H pulse upon reception of light, the terminal INT_SLV must be interrupted in response to a leading edge. Therefore, after #19, slave emission is enabled.

On the other hand, if it is determined in #17 and #18 that the slave mode is OFF, the flow advances to #20 to inhibit the interrupt of the terminal INT_SLV and to clear the interrupt request. Therefore, since no interrupt is generated, a series of slave function operations will not be executed.

In this manner, the setting operation of the slave function of the electronic flash device, which is not connected to the camera, is completed, and the flow returns in #22.

On the other hand, if it is determined in #16 that the electronic flash device is connected to the camera, the flow advances to #21. As described above, since the master flash device does not perform slave emission, the interrupt of the terminal INT_SLV is inhibited and the interrupt request is cleared as in #20. Thereafter, the flow returns in #22.

As described above, the processing associated with the slave function setting operation is completed.

Figure 5:
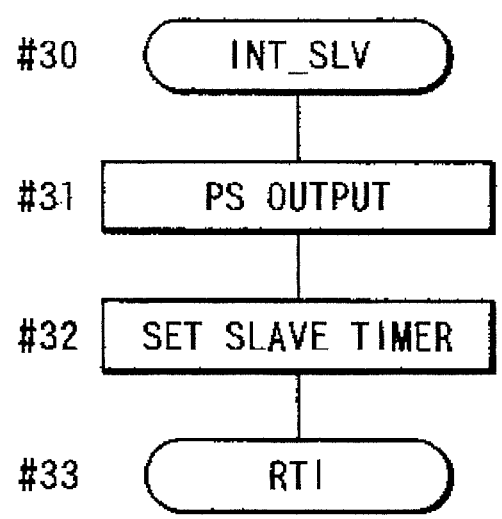
FIG. 5 is a flow chart of software of the microcomputer of the electronic flash device according to the embodiment of the present invention, i.e., showing INT_SLV interrupt processing.

Next, the processing from when the light-receiving circuit SLV_CKT receives light until the electronic flash device performs slave emission will be explained below. FIG. 5 shows the INT_SLV interrupt processing. In #31 immediately after the interrupt processing is started in #30, an H-level signal is output from the port PS. Since the port PS is normally set to output an L-level signal, an H-level signal can be immediately output by changing the data register to H. In practice, since a bit operation command is used, and various registers can be prevented from being destroyed, an output to the port may be executed prior to saving of the register normally executed in #30. Therefore, the number of commands inserted from when the INT_SLV interrupt is generated until the port PS changes is minimum, and a quick response can be made by fully utilizing the CPU performance.

If the slave function setting switch 6 is set in the S mode, the transistors Q1, Q2, and Q3 are turned on in turn in response to the H-level output from the port PS, and a synchronous signal is output. In response to this signal, the electronic flash device itself and another electronic flash device or devices connected to the synchronous terminal 7 can perform light emission.

Figure 8:
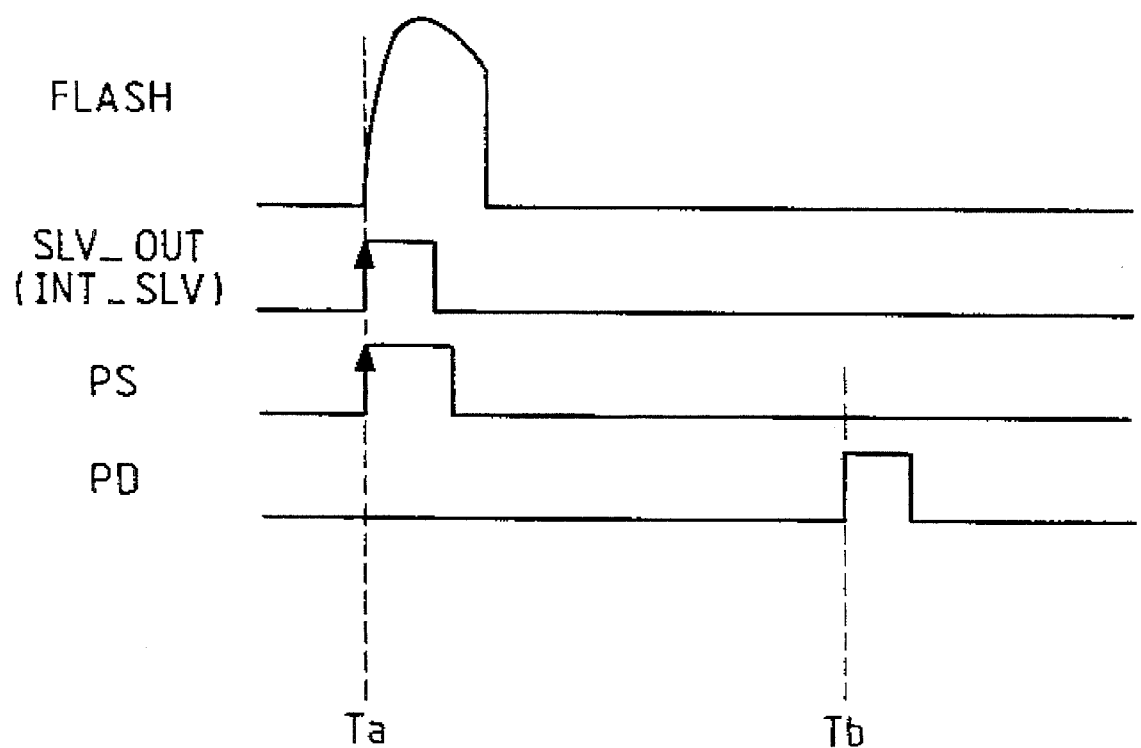
FIG. 8 is a timing chart upon execution of a slave function of the electronic flash device according to the embodiment of the present invention.

FIG. 8 is a timing chart showing this state. As shown in FIG. 8, a signal is input to the INT_SLV terminal at the leading edge of a light-emission waveform FLASH, and an H-level signal is output from the port PS with almost no delay time, as described above.

Referring back to FIG. 5, the port PS is reset to L in #31, and a slave timer for forming a delay time for the D mode is set in #32. For example, 1 ms longer than the flash time of the electronic flash device is set in the timer. This slave timer generates a timer interrupt after an elapse of the setting time. The measurement time of the timer is preferably 4 ms or less.

In #33, restoration processing from the interrupt is performed, and the flow returns. As described above, the slave processing in the S mode is completed. If the slave function setting switch 6 is set in the D mode, since the port PS is not connected to any circuit on its output side, it does not operate, and is completely isolated from the circuitry for the S mode.

Figure 6:
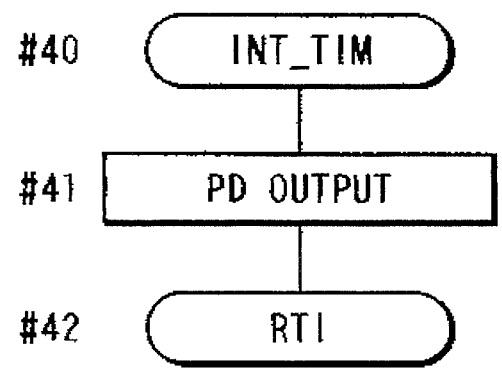
FIG. 6 is a flow chart of software of the microcomputer of the electronic flash device according to the embodiment of the present invention, i.e., showing INT_TIM interrupt processing.

In the case of the D mode, after an elapse of the slave timer time, a timer interrupt is generated at time Tb in FIG. 8, and INT_TIM processing in FIG. 6 is started in #40. When an H-level signal is output to the port PD in #41, this signal immediately generates a synchronous signal.

As can be seen from FIG. 8, after the light emission of the master flash device is stopped by automatic light control, the synchronous signal for the D mode is generated. Therefore, the slave emission in the D mode is independently performed without influencing the light control, such as TTL automatic light control, of the master flash device.

FIG. 10 shows this state in more detail. FIG. 10 shows the schematic arrangement of the camera and the electronic flash device. A camera 10 comprises at least a CPU 101 as a central function for instructing operations, mode selection means 102 for selecting a photographing mode, a photometry circuit 103 for measuring the brightness of an object under steady light and when the electronic flash device is used, a shutter control circuit 104 for controlling the shutter speed, and an interface 105 which is electrically connected to the electronic flash device to exchange various kinds of information. The CPU 101 and the mode setting means 102 are connected via a connection line 10a, and the CPU 101 and the photometry circuit 103 are connected via a connection line 10b. The CPU 101 and the shutter control circuit 104 are connected via a connection line 10c, and the CPU 101 and the interface 105 are connected via a connection line 10d. An electronic flash device 8 comprises at least a CPU 81 as a central function for instructing operations, mode setting means 82 for selecting a light emission mode, an emission control circuit 83 including a light emission tube and controlling the light emission amount of the light emission tube, and an interface 84 which is electrically connected to the camera to exchange various kinds of information. The CPU 81 and the mode setting means 82 are connected via a connection line 8a. The CPU 81 and the emission control circuit 83 are connected via a connection line 8b. The CPU 81 and the interface 84 are connected via a connection line 8c.

When the mode setting means 82 of the electronic flash device selects a delayed slave emission mode, the information indicating the mode (information including a delay time) is supplied to the CPU 81 via the line 8a, and is further supplied to the interface 84 via the line 8c. The information is supplied from the interface 84 of the electronic flash device 8 to the interface 105 of the camera 10 via an electrical contact. The supplied information is input to the CPU 101 via the line 10d. The CPU 101 calculates a delay amount for the currently set synchronous time on the basis of the input information, and instructs an optimal synchronous time to the shutter control circuit 104 via the line 10c on the basis of the calculation result.

In a state wherein the delayed slave emission mode is selected by the mode setting means 82 of the electronic flash device, when a rear synchronous photographing mode for the camera 10 is also selected, the information indicating this mode (information including a delay time) is supplied to the CPU 81 via the line 8a. Since the CPU 81 includes a timer circuit, it preferentially sets the rear synchronous photographing mode, and inhibits the delayed slave emission mode. Since this processing validates both the rear synchronous photographing mode and the slave emission mode, no practical problem is posed. Therefore, the CPU 81 informs the rear synchronous photographing mode to the interface 84 via the line 8c, and this information is further supplied to the CPU 101 of the camera 10 via the electrical contact, the interface 105, and the line 10d. The CPU 101 controls the shutter control circuit via the line 10c on the basis of the received information.

As in the above description, when the rear synchronous photographing mode is set by the camera 10, if the rear synchronous photographing mode is stated to the electronic flash device 8 in a state wherein the delayed slave emission mode is selected by the mode setting means 82 of the electronic flash device 8, this information is supplied from the CPU 101 to the interface 105 via the line 10d, and is then supplied to the CPU 81 of the electronic flash device 8 via the electrical contact, the interface 84, and the line 8c. Since the CPU 81 includes a timer circuit, it preferentially sets the rear synchronous photographing mode and inhibits the delayed slave emission mode on the basis of the received information. Since this processing validates both the rear synchronous photographing mode and the slave emission mode, no practical problem is posed.

On the other hand, in a state wherein the delayed slave emission mode is selected by the mode setting means 82 of the electronic flash device, the rear synchronous photographing mode for the camera 10 is inhibited, and the delayed slave emission mode is often preferentially set in practice. This is because, as described above, when the selected emission mode of the slave unit adversely influences the TTL light control level, an intended photographing operation cannot be attained if the rear synchronous photographing mode is preferentially set. In this case, if the delayed slave emission mode is selected, the CPU 81 invalidates the rear synchronous photographing mode even if the rear synchronous photographing mode is selected by the mode setting means 82.

When the camera 10 sets the rear synchronous photographing mode by the mode setting means 102 in a state wherein the delayed slave emission mode is selected by the mode setting means 82 of the electronic flash device, the electronic flash device 8 often rejects setting of the rear synchronous photographing mode. In this case, the delayed slave emission mode is preferentially set in practice. This is because, as described above, when the selected emission mode of the slave unit adversely influences the TTL light control level, an intended photographing operation cannot be attained if the rear synchronous photographing mode is preferentially set. In this case, the rear synchronous photographing mode is selected by the mode setting means 102, and this selection information is supplied from the CPU 101 to the CPU 81 of the electronic flash device 8 via the line 10d, the interface 105, the electrical contact, the interface 84, and the line 8c. However, in order to preferentially set the delayed slave emission mode, the CPU 81 supplies information indicating that the rear synchronous photographing mode is inhibited to the CPU 101 of the camera 10 via the line 8c, the interface 84, the electrical contact, the interface 105, and the line 10d. The camera 10 preferentially sets the mode selected by the electronic flash device 8 and inhibits the rear synchronous photographing mode on the basis of the input information.

Having described specific embodiments of the present invention, it is to be understood that any variations will occur to those skilled in the art within the scope of the appended claims.

What is claimed is:

1. A camera system including an electronic flash device with a slave emission function, which comprises:

an electronic flash device including: a light-receiving unit for receiving a steep optical signal; a light-emitting unit for slave-emitting illumination light toward an object in response to the optical signal received by said light-receiving unit; a timer for starting a time measurement operation in response to the optical signal input to said light-receiving unit, and permitting an operation of said light-emitting unit after an elapse of a predetermined period of time; an attachment member used for attaching/detaching said device to/from a camera body; and a data communication function unit for exchanging various data including photographing information with the camera body via said attachment member; and a camera body electrically connected to said electronic flash device, wherein said data communication function unit delays a synchronous time set by the camera body side in correspondence with the measurement time of said timer.

2. A camera system according to claim 1, wherein the measurement time of said timer is not more than 4 ms.

3. A camera system according to claim 1, wherein said timer comprises a software circuit realized by a microcomputer.

4. A camera system according to claim 1, wherein said data communication function unit comprises a microcomputer.

5. A camera body on which an electronic flash device can be mounted, said electronic flash device including: a light-receiving unit for receiving a steep optical signal; a light-emitting unit for slave-emitting illumination light toward an object in response to the optical signal received by said light-receiving unit; a timer for starting a time measurement operation in response to the optical signal input to said light-receiving unit, and permitting an operation of said light-emitting unit after an elapse of a predetermined period of time; an attachment member used for attaching/detaching said device to/from said camera body; and a data communication function unit for exchanging various data including photographing information with said camera body via said attachment member, wherein said data communication function unit delays a synchronous time set by the camera body side in correspondence with the measurement time of said timer.

6. A camera body according to claim 5, wherein said timer comprises a software circuit realized by a microcomputer.

7. A camera body according to claim 5, wherein said data communication function unit comprises a microcomputer.

8. A camera system including an electronic flash device with a slave emission function, which comprises:

an electronic flash device including: a light-receiving unit for receiving a steep optical signal; a light-emitting unit for slave-emitting illumination light toward an object in response to the optical signal received by said light-receiving unit; a timer for starting a time measurement operation in response to the optical signal input to said light-receiving unit, and permitting an operation of said light-emitting unit after an elapse of a predetermined period of time; an attachment member used for attaching/detaching said device to/from a camera body; and a data communication function unit for exchanging various data including photographing information with the camera body via said attachment member; and a camera body electrically connected to said electronic flash device, said system further comprising:

a time measurement operation inhibition unit for inhibiting the time measurement operation by said timer when one of said electronic flash device and said camera body requests a rear synchronous photographing mode to the other.

9. A camera system according to claim 8, wherein said timer comprises a software circuit realized by a microcomputer.

10. A camera system according to claim 8, wherein said data communication function unit and said time measurement operation inhibition unit comprise a microcomputer.

11. A camera system including an electronic flash device with a slave emission function, which comprises:

an electronic flash device including: a light-receiving unit for receiving a steep optical signal; a light-emitting unit for slave-emitting illumination light toward an object in response to the optical signal received by said light-receiving unit; a timer for starting a time measurement operation in response to the optical signal input to said light-receiving unit, and permitting an operation of said light-emitting unit after an elapse of a predetermined period of time; an attachment member used for attaching/detaching said device to/from a camera body; and a data communication function unit for exchanging various data including photographing information with the camera body via said attachment member; and a camera body electrically connected to said electronic flash device, said system further comprising:

a rear synchronous emission inhibition unit for, when the measurement time by said timer is set, inhibiting rear synchronous emission for performing light emission immediately before a shutter rear curtain begins to travel.

12. A camera system according to claim 11, wherein said timer comprises a software circuit realized by a microcomputer.

13. A camera system according to claim 11, wherein said data communication function unit and said rear synchronous emission inhibition unit comprise a microcomputer.

14. A camera system including an electronic flash device with a slave emission function, which comprises:

an electronic flash device including: a light-receiving unit for receiving a steep optical signal; a light-emitting unit for slave-emitting illumination light toward an object in response to the optical signal received by said light-receiving unit; a timer for starting a time measurement operation in response to the optical signal input to said light-receiving unit, and permitting an operation of said light-emitting unit after an elapse of a predetermined period of time; an attachment member used for attaching/detaching said device to/from a camera body; and a data communication function unit for exchanging various data including photographing information with the camera body via said attachment member; and a camera body electrically connected to said electronic flash device, said system further comprising:

a rear synchronous emission inhibition unit for inhibiting a rear synchronous emission mode for performing light emission immediately before a shutter rear curtain begins to travel if the measurement time by said timer is set even when the rear synchronous emission mode is requested from the camera body side to said electronic flash device.

15. A camera system according to claim 14, wherein said timer comprises a software circuit realized by a microcomputer.

16. A camera system according to claim 14, wherein said data communication function unit and said rear synchronous emission inhibition unit comprise a microcomputer.

* * * * *